Oct. 12, 1943.   E. G. HJÄRPE ET AL   2,331,779
MOTION TRANSMITTING DEVICE, ESPECIALLY FOR MEASURING APPARATUS
Filed Dec. 26, 1941   2 Sheets-Sheet 2
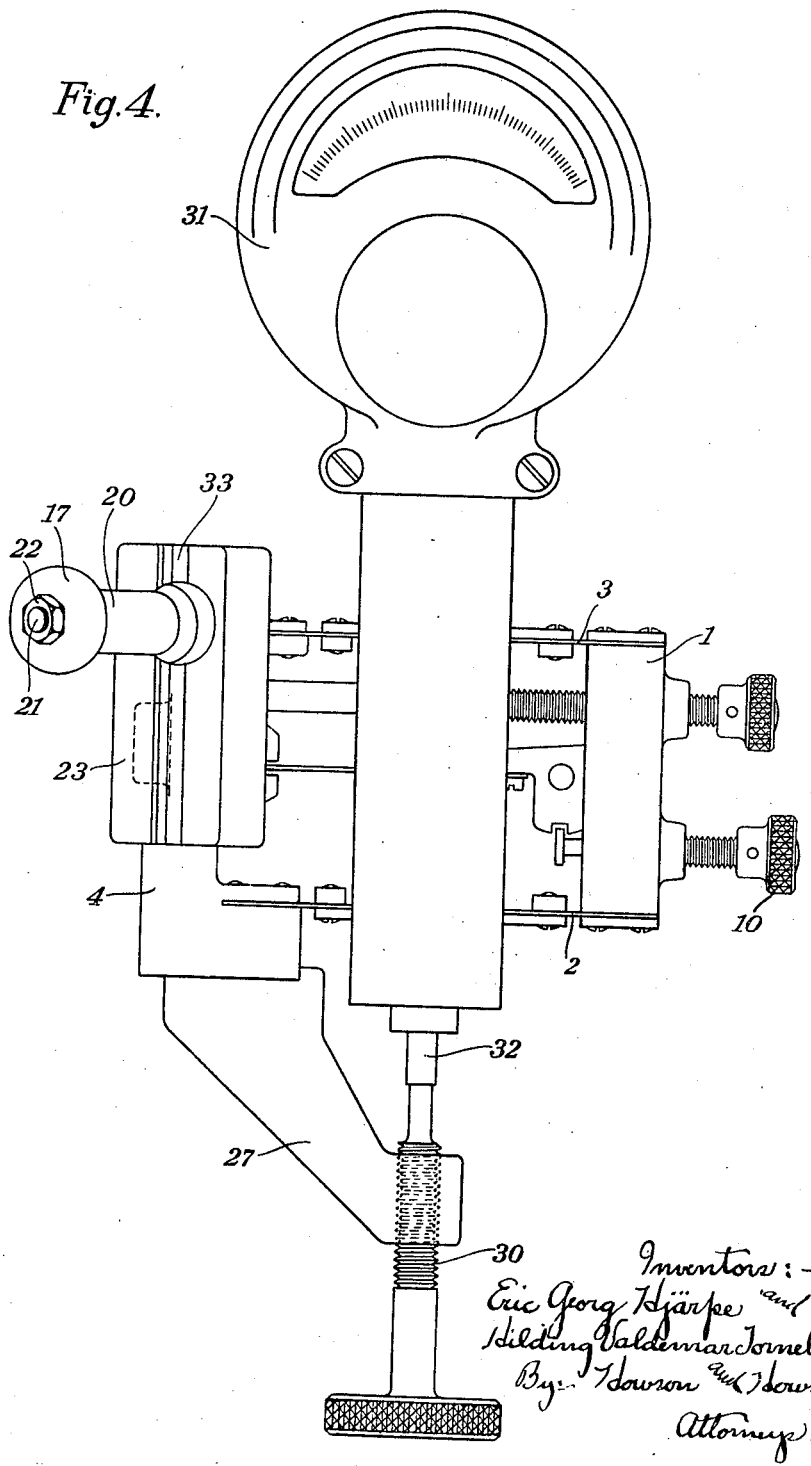

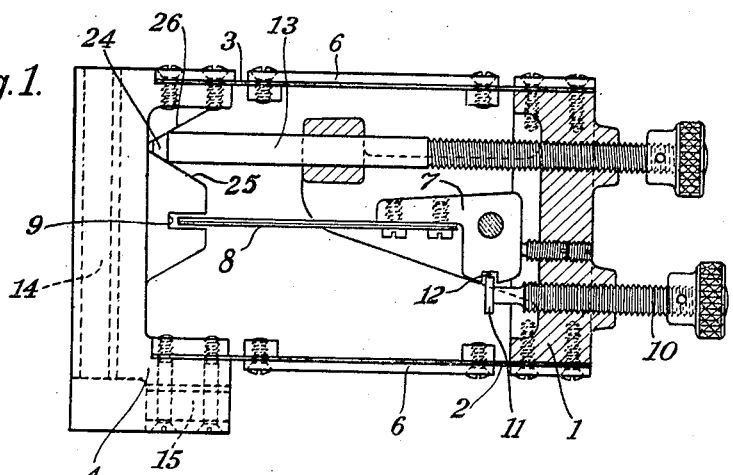
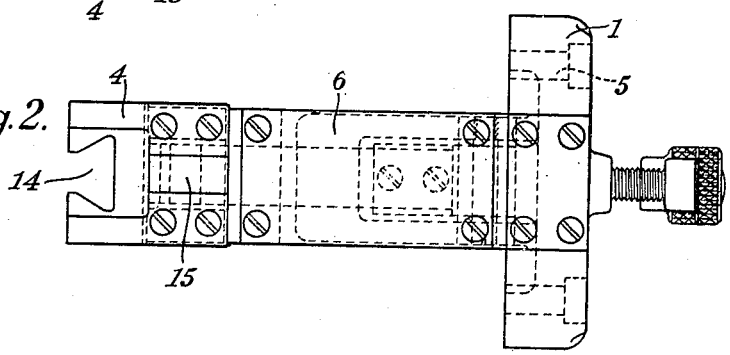
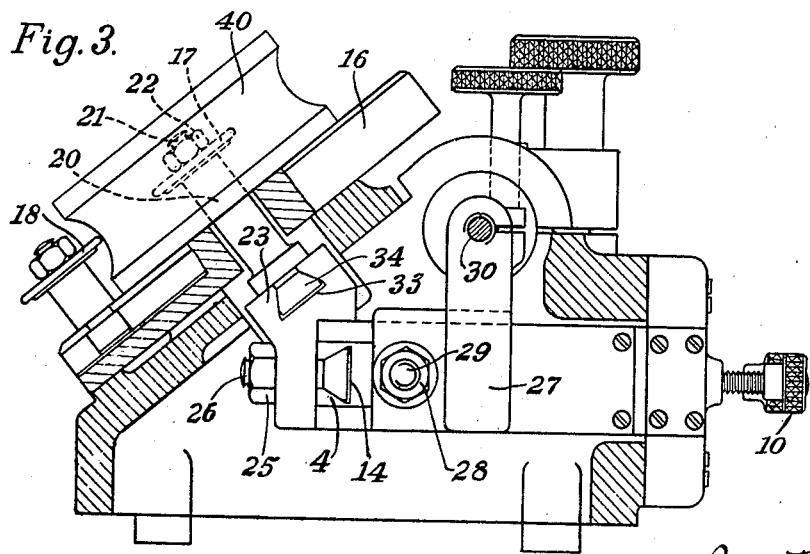

Patented Oct. 12, 1943

2,331,779

UNITED STATES PATENT OFFICE 2,331,779

MOTION TRANSMITTING DEVICE, ESPECIALLY FOR MEASURING APPARATUS

Eric Georg Hjärpe and Hilding Valdemar Törnebohm, Goteborg, Sweden, assignors to SKF Industries, Inc., Philadelphia, Pa., a corporation of Delaware Application December 26, 1941, Serial No. 424,532
In Sweden February 7, 1941

3 Claims. (Cl. 33—147)

The present invention relates to a motion transmitting device for the transmission of motion from a movable gaging finger or contact member to a measuring instrument, for example a minimeter in a measuring apparatus. The motion transmitting mechanism comprises mainly a fixed member and a connecting member which is movably connected to the fixed member through two substantially parallel leaf springs fixed to the fixed member. The device may be made as a separate insert which is universally applicable to different kinds of gaging members and different kinds of measuring instruments.

When the length of the leaf springs exceeds a certain value, they may bend in an unforseen manner. There is therefore no certainty that the connecting member carried by the leaf spring moves in the desired path. In known devices the travel of the connecting member has therefore of necessity been short.

One purpose of this invention is therefore to provide a device of the kind referred to in which this limitation is avoided.

Another purpose of the invention is to provide a device for obtaining a gaging pressure in the desired direction and of desired magnitude for all different kinds of measuring operations.

An embodiment of the invention is illustrated on the accompanying drawings in which Figs. 1 and 2 show different projections perpendicular to each other of the motion transmitting mechanism.

Fig. 3 shows on a smaller scale a side view partly in section of a device according to the invention mounted upon a gaging apparatus for ball or roller bearing race rings.

Fig. 4 shows another projection of the device according to Fig. 3 with the base removed.

The motion transmitting device which is shown in Figs. 1 and 2 is made as a separate unit which can be mounted on the base or frame of a measuring or gaging apparatus or the like. This motion transmitting mechanism comprises a fixed member 1, two parallel leaf springs 2 and 3 fixed thereto and a movable block 4 serving as a connecting member. The fixed member 1 is provided with threaded holes 5 for the purpose of attaching it to the gaging apparatus. The springs 2 and 3 carry the block and guide it in a parallel movement when it is actuated by pressure. Since the movements which take place are small relative to the length of the leaf springs 2 and 3, the movement of the block will be almost in a straight line perpendicular to the springs. The movement of the block 4 takes place with no play or lost motion whatever, and consequently any motion which is imparted to one end thereof, will correspond to an exactly similar motion at the other end of the block.

In order to avoid indeterminable bending of the springs 2 and 3, they are stiffened along the greater part of their length by plates 6 screwed thereto. In this manner the bending of the springs is concentrated to the part of the same located nearest to the fixed member 1 and the block 4.

The unit is provided with a device for exerting a spring pressure on the block 4 in alternative directions. This device comprises an angle lever 7 pivotally fixed to the fixed member 1 and having fixed thereto a leaf spring 8 projecting into a groove 9 in the block 4. A screw 10 in the fixed member 1 has a flanged end 11 engaging a groove 12 in the angle lever 7. By turning the screw 10 it is possible to turn the angle lever in the required direction and thereby cause the spring 8 to press against the block 4 in alternative directions. It is thereby possible to impart to the motion transmitting device a gaging pressure of the desired direction and magnitude when using it with a gaging apparatus.

In order to limit the travel of the block 4 a screw 13 is provided, screwed into a threaded hole in the fixed member 1 and having a conical end 24 located between two slanting surfaces 25 and 26 on the block 4. The further the screw 13 is screwed in between the surfaces, the shorter will be the travel permitted to the block 4. If the screw 13 is screwed into contact with the slanting surfaces, as shown in Fig. 1, motion of the block 4 will be entirely prevented which is of advantage when the device is being transported.

In order to connect the block 4 to the parts between which motion is to be transmitted, the block 4 is provided with two dove-tailed grooves 14 and 15.

Figs. 3 and 4 show the motion transmitting unit mounted on a gaging device for ball bearing rings. The race ring 40 which is to be gaged, is placed on a plate 16 between three contact discs. Two of these are adjustable in grooves in the plate and are intended to be fixedly located during the gaging operation. One of the fixed contact discs is shown at 18 in Fig. 3, and the other fixed disc is located 90° from the disc 18 but is not shown in Fig. 3. The third disc 17 is movable in a groove in the plate 16 and comprises the actual gaging member.

The unit shown in Figs. 1 and 2 is used according to Figs. 3 and 4 to transmit the motion of the contact disc 17 to the contact point 32 of a minimeter 31. The disc 17 is connected to an arm 23 by means of a sleeve 20, a screw 21 and a nut 22. The arm 23 has a dove-tailed groove 33 in which the head 34 of the screw 21 engages, and the contact disc can therefore be fixed in any desired position along the length of the groove. The arm 23 is in its turn rigidly connected to the block 4 by means of a nut 25 and a screw 26, the head of which engages the groove 14 in the block 4. In this manner the contact disc 17 is rigidly connected to and carried by the block 4.

Another arm 27 is connected to the block at its other end by means of a nut 28 and a screw 29 (see Fig. 3), the head of which engages the groove 15 in the block. The arm 27 has a threaded hole for receiving a screw 30. The minimeter 31 is mounted on the base of the apparatus with its contact point 32 arranged in alignment with the screw 30. In gaging, the screw 30 contacts against the contact point 32.

In the apparatus described the motion of the contact disc is transmitted to the minimeter 31 through the following parts, viz., the sleeve 20 and the screw 21, the arm 23, the block 4, the screw 29, the arm 27, the screw 30 and the contact 32.

When a certain kind of work, for instance a ball bearing race ring 40 is to be gaged, the fixed contact discs such as 18 are first adjusted to a suitable position. The movable contact disc 17 is adjusted against a work piece having the standard dimension of the work to be gaged, and the gaging pressure is adjusted by means of the screw 10. Thereafter the zero reading of the minimeter is adjusted by means of the screw 30, and the apparatus is ready for use. When a work piece is inserted between the contact discs, the disc 17 will assume a position corresponding to the dimension of the work at the point in question. The motion of the contact disc 17 is transmitted through the device described above to the contact point of the minimeter and the dimension of the work relative to the nomial dimension can be read on the scale of the minimeter.

The invention is not limited to the embodiment illustrated, but different modifications can be made without departing from the spirit of the invention. The motion transmitting device can be used in a great number of different gaging apparatus and other devices in which motion is to be transmitted from one member to another.

Having thus described our invention, we claim and desire to secure by Letters Patent:

1. A motion transmitting device, especially for gaging apparatus comprising a fixed member and a connecting member, a pair of substantially parallel leaf springs movably connecting the connecting member to the fixed member, a third spring movably connected to the fixed member and operatively connected to the connecting member, and means for adjusting the said third spring to provide for pressure thereof on the connecting member selectively in alternative different directions.

2. A motion transmitting device, especially for gaging apparatus comprising a fixed member and a connecting member, a pair of substantially parallel leaf springs movably connecting the connecting member to the fixed member, a third spring pivotally connected to the fixed member and having a free end engaging a groove in the connecting member, and adjusting means for causing the said third spring to pivot with respect to the fixed member.

3. A motion transmitting device, especially for gaging apparatus comprising a fixed member and a connecting member, a pair of substantially parallel leaf springs movably connecting the connecting member to the fixed member, a third spring carried by a member pivotally connected to the fixed member and having a free end engaging a groove in the connecting member, an adjustable screw threadedly engaging the fixed member and engaging a groove in the pivotable member for adjusting the pivotable member in alternative directions.

ERIC GEORG HJÄRPE.
HILDING VALDEMAR TÖRNEBOHM.